Nov. 13, 1923.
W. JAEGER
1,474,263
COMBINED VEHICLE FENDER AND BUMPER
Filed Aug. 9, 1923
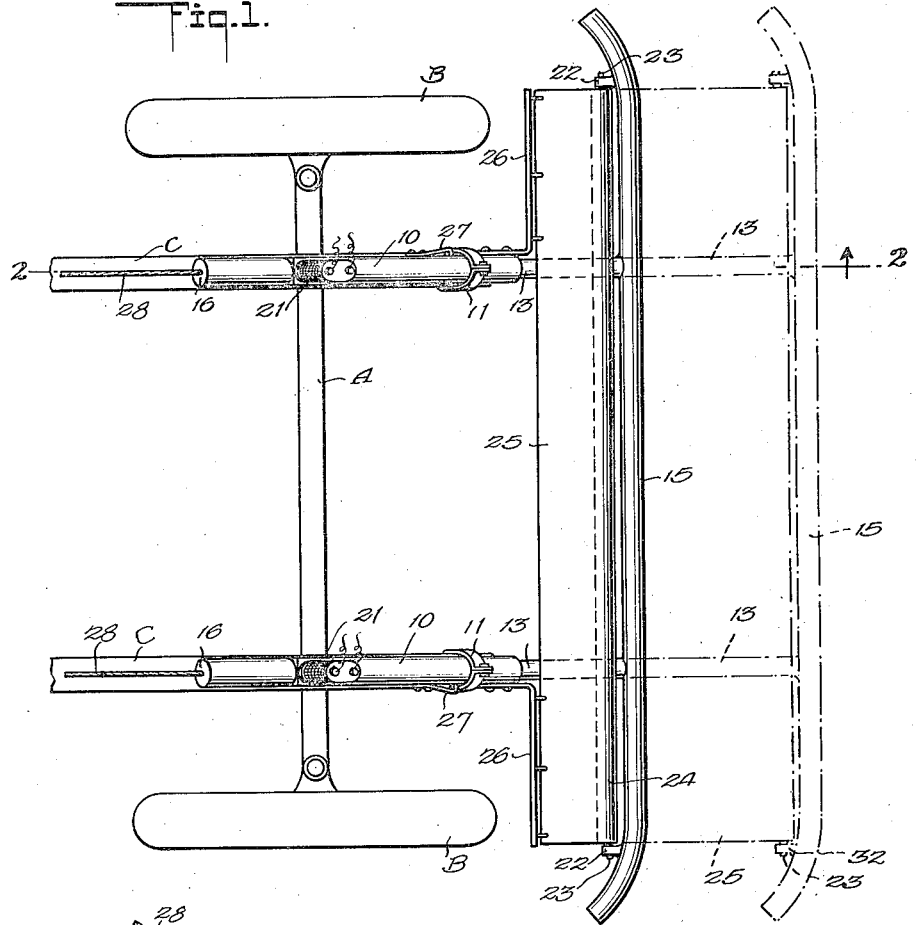
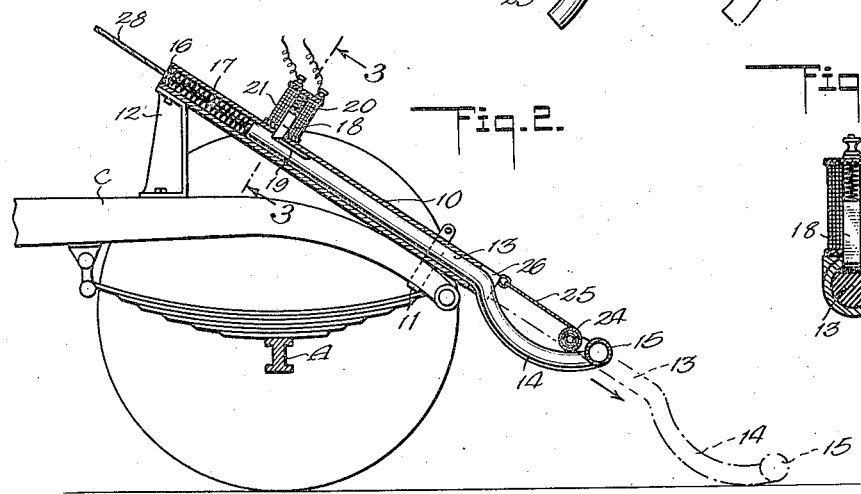
WITNESSES
Frederick Diehl.
Hugh H. Ott
INVENTOR
WALTER JAEGER
BY
ATTORNEYS Patented Nov. 13, 1923.

1,474,263

UNITED STATES PATENT OFFICE.

WALTER JAEGER, OF HOBOKEN, NEW JERSEY.

COMBINED VEHICLE FENDER AND BUMPER.

Application filed August 9, 1923. Serial No. 656,543.

*To all whom it may concern:*

Be it known that I, WALTER JAEGER, a citizen of Germany, and a resident of Hoboken, in the county of Hudson and State of New Jersey, have made new and useful Improvements in a Combined Vehicle Fender and Bumper, of which the following is a full, clear, and exact description.

This invention has relation to vehicles and has particular reference to a combined fender and bumper for automobiles.

The outstanding object of the present invention is to provide as an attachment for the front of an automobile, a protective device which normally serves in the capacity of a bumper and which is operable by the driver of the vehicle to be moved in a position to pick up a pedestrian in the path of movement of the vehicle.

Another object in view is to provide a combined fender and bumper which is capable of being readily attached to the chassis of an automobile without the necessity of materially altering the same and which when applied will effectually protect the vehicle against contact with other vehicles or obstacles, while at the same time serving as a means for fending off or picking up pedestrians, where accidental hitting of the same is unavoidable.

As a still further object the invention contemplates a combined fender and bumper for vehicles which is comparatively simple in its construction, inexpensive to manufacture and which is strong, durable and efficient.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a plan view illustrating the combined fender and bumper in applied position to the vehicle and illustrating respectively in full and dotted lines the normal and shifted positions of the device.

Fig. 2 is a longitudinal sectional view through the attachment, the same being taken approximately on the line 2—2 of Fig. 1.

Fig. 3 is a transverse sectional view therethrough taken approximately on the line 3—3 of Fig. 2.

Referring to the drawings by characters of reference, A designates the front axle of a vehicle, B the front wheels and C the side rails of the chassis.

The combined fender and bumper constituting the invention comprises a pair of tubular housings 10, each of which is supported from the forward end of the side rails of the chassis C by a suitable clamp 11 and a bracket 12, whereby the housings are disposed at a forwardly and downwardly directed angle. Within each tubular housing 10 a shank 13 is axially or telescopically slidable and the said shanks are provided with upwardly curved or arcuate forward ends 14 which are connected by a transverse bumper bar or rail 15. The rear end of each housing is closed by a centrally apertured plug 16 which is preferably threaded into the rear end. A strong coiled spring 17 is interposed between the rear ends of the shanks 13 and the closure plugs 16 for normally exerting a pressure on the shanks to effect forward axial movement of the same in the housings 10. On the upper side of each housing adjacent the rear end an electromagnetically operated latch 18 is mounted which projects through an opening in the housing and engages with a keeper notch 19 in the rear ends of the shank. A spring 20 normally moves the latch to a position for engaging the keeper notch 19 and the electromagnet 21 operates to retract the same when the circuit in which it is arranged, is closed. The latch when engaged with the keeper notches 19 serves to hold the shanks 13 and bumper bar or rail 15 in a retracted position against the inherent tendency of the springs 17 to move the same forwardly and downwardly. In this retracted position the convolutions of the springs 17 are sufficiently separated to admit of the tensioning of the shanks and bumper bar 15 against rearward movement whereby contact of the bumper with another vehicle or obstruction will allow for the cushioning or absorbing of the shock by means of the springs 17. For this reason the keeper notches are of a sufficient length to allow for rearward movement of the shanks 13. Adjacent it opposite ends the bumper bar rail 15 is provided with rearwardly projecting bearing lugs 22 in which the trunnions 23 of a roller 24 are journaled. The roller 24 has wound thereon a portion of a flexible fender body or barrier 25, the free edge of which is attached to the laterally projecting brackets 26 whereby upon releasing of the magnetically controlled latches 18 and forward and downward movement of the bumper bar or rail 15 the said flexible fender body or barrier 25 will be unwound from the roller 24 and distended to constitute a fender or barrier for picking up or fending to one side a pedestrian in the path of movement of the vehicle. When the latches 18 have been released and the shanks 13 moved forwardly a predetermined distance, spring retaining elements 27 which are secured to the housings 10 will snap in rear of the rear ends of the shanks 13 to hold the same in projected position. In projected position it will be noted that the upwardly curved or arcuate forward ends of the shanks 13 will act as runners or skids for contact with the road or street surface and further that the same underlie and brace the fender body to limit the sagging thereof. In order to provide means for re-setting the device after the same has been moved to function as a fender, a cable 28 is attached to the rear end of each shank 13 and extends through the apertured closure plug 16 to a point inside of the dash of the vehicle whereby the operator may exert a rearward pull on the same until the latches 18 are re-engaged. It is, of course, understood that any suitable means for simultaneously closing the circuit in which the electromagnets 21 are arranged may be employed, such as a push button, not shown, which will be located within convenient reach of the operator of the vehicle.

From the foregoing it will thus be seen that a combined fender and bumper has been provided for use in connection with automobiles or motor vehicles whereby both the vehicle and pedestrians are protected against accident.

I claim:

1. A combined fender and bumper for automobiles, comprising a transverse bumper bar supported from the forward end of the chassis respectively for downward and forward movement and upward and rearward movement, a common means for effecting the first movement and for tensioning the same against the latter movement, means for retaining the same against the former movement, manually controlled magnetically operable means for releasing said retaining means, and a strip of extensible material secured at its rear end to the forward end of the chassis, and means carried by the cross bar to which the opposite front end of the extensible material is secured and upon which the same is normally wound.

2. A combined fender and bumper attachment for motor vehicles, comprising a pair of downwardly and forwardly inclined tubular housings secured to the forward end of the vehicle, a transverse bumper bar, shanks projecting rearwardly from the bumper bar and telescopically received in the tubular housings whereby to permit respectively of downward and forward projection and rearward and upward retraction of the bumper bar, an extensible barrier or fender element of a width equal to the gage of the vehicle wheels, secured respectively at its front and rear edges to the bumper member and the forward end of the vehicle, coiled expansion springs interposed between the rear closed end of the tubular housings and the rear end of the shanks constituting a common means for projecting the bumper member forwardly and downwardly and for tensioning the same against upward and rearward retraction, the said rearwardly projecting shanks having keeper notches therein, spring actuated latches for normally engaging the keeper notches to retain the bumper bar in partially projected position and the springs under partial compression, and magnetically operable means for retracting the latches to release the same whereby to permit the springs to project the bumper bar forwardly and downwardly to extend the barrier member and position the same in front of the vehicle wheels.

3. A combined fender and bumper attachment for motor vehicles, comprising a pair of downwardly and forwardly inclined tubular housings secured to the forward end of the vehicle, a transverse bumper bar, shanks projecting rearwardly from the bumper bar and telescopically received in the tubular housings whereby to permit respectively of downward and forward projection and rearward and upward retraction of the bumper bar, an extensible barrier or fender element of a width equal to the gage of the vehicle wheels, secured respectively at its front and rear edges to the bumper member and the forward end of the vehicle, coiled expansion springs interposed between the rear closed end of the tubular housings and the rear end of the shanks constituting a common means for projecting the bumper member forwardly and downwardly and for tensioning the same against upward and rearward retraction, the said rearwardly projecting shanks having keeper notches therein, spring actuated latches for normally engaging the keeper notches to retain the bumper bar in partially projected position and the springs under partial compression, magnetically operable means for retracting the latches to release the same whereby to permit the springs to project the bumper bar forwardly and downwardly to extend the barrier member and position the same in front of the vehicle wheels, and means engageable with the rear ends of the rearwardly projecting shanks when projected for preventing retraction thereof.

4. A combined fender and bumper attachment for motor vehicles, comprising a pair of downwardly and forwardly inclined tubular housings secured to the forward end of the vehicle, a transverse bumper bar, shanks projecting rearwardly from a bumper bar and telescopically received in the tubular housings whereby to permit respectively of downward and forward projection and rearward and upward retraction of the bumper bar, an extensible barrier or fender element of a width equal to the gage of the vehicle wheels, secured respectively at its front and rear edges to the bumper member and the forward end of the vehicle, coiled expansion springs interposed between the rear closed end of the tubular housings and the rear end of the shanks constituting a common means for projecting the bumper member forwardly and downwardly and for tensioning the same against upward and rearward retraction, the said rearwardly projecting shanks having keeper notches therein, spring actuated latches for normally engaging the keeper notches to retain the bumper bar in partially projected position and the springs under partial compression, magnetically operable means for retracting the latches to release the same whereby to permit the springs to project the bumper bar forwardly and downwardly to extend the barrier member and position the same in front of the vehicle wheels, means engageable with the rear ends of the rearwardly projecting shanks when projected for preventing retraction thereof, and means connected with the rear ends of said shanks and extending through the closed rear ends of the tubular housings for retracting the bumper bar whereby to reset the attachment.

WALTER JAEGER.